(12) United States Patent
Heinks et al.

(10) Patent No.: US 7,920,249 B2
(45) Date of Patent: Apr. 5, 2011

(54) DEVICE AND METHOD FOR MEASURING RELATIVE MOVEMENT

(75) Inventors: Carsten Heinks, Nordhorn (DE); Marcel Schemmann, Maria Hoop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 230 days.

(21) Appl. No.: 12/097,352

(22) PCT Filed: Dec. 20, 2006

(86) PCT No.: PCT/IB2006/054980
§ 371 (c)(1),
(2), (4) Date: Oct. 28, 2008

(87) PCT Pub. No.: WO2007/072446
PCT Pub. Date: Jun. 28, 2007

(65) Prior Publication Data
US 2009/0303458 A1 Dec. 10, 2009

(30) Foreign Application Priority Data
Dec. 20, 2005 (EP) .................. 05112471

(51) Int. Cl.
*G01C 3/08* (2006.01)
(52) U.S. Cl. .................................... 356/5.09
(58) Field of Classification Search ......... 356/3.01–28.5
See application file for complete search history.

(56) References Cited

U.S. PATENT DOCUMENTS

| | | | |
|---|---|---|---|
| 5,267,016 A | 11/1993 | Meinzer et al. | |
| 5,587,785 A | 12/1996 | Kato et al. | |
| 5,594,543 A | 1/1997 | De Groot et al. | |
| 5,745,437 A | 4/1998 | Wachter et al. | |
| 5,847,817 A * | 12/1998 | Zediker et al. | 356/5.09 |
| 6,100,965 A | 8/2000 | Nerin | |
| 6,233,045 B1 | 5/2001 | Suni et al. | |
| 6,388,739 B1 | 5/2002 | Rice | |
| 2005/0105100 A1 | 5/2005 | Swindal | |
| 2007/0206180 A1 * | 9/2007 | Liess | 356/28 |

FOREIGN PATENT DOCUMENTS

| | | |
|---|---|---|
| DE | 4400680 C2 | 11/1995 |
| EP | 0942285 A1 | 9/1999 |
| WO | 0237410 A1 | 5/2002 |
| WO | 03098527 A2 | 11/2003 |
| WO | 2005076116 A2 | 8/2005 |

OTHER PUBLICATIONS

Peter J. De Groot, et al: Backscattler-Modulation Velocimetry with an External-Cavity Laser Diode, Optics Letter, OSA. Optical Society of America, vol. 14, No. 3, Feb. 1, 1989, pp. 165-167.

* cited by examiner

*Primary Examiner* — Thomas H Tarcza
*Assistant Examiner* — Luke D Ratcliffe

(57) ABSTRACT

A device for measuring movement of an object (15) and the device relative to each other. The device comprises a laser (3) for generating a measuring beam (13), which is converged by a lens (10) in an action plane. Radiation reflected by the object (15) is converged to re-enter the laser cavity to generate a self-mixing effect in the laser (3). Measuring means (4) are provided to receive the reflected measuring beam radiation and enable the frequency difference between the measuring beam (13) and the reflected measuring beam radiation to be determined, which is representative of the relative movement.

13 Claims, 3 Drawing Sheets

DEVICE AND METHOD FOR MEASURING RELATIVE MOVEMENT

The invention relates generally to a device for measuring movement of an object and the device relative to each other, the device comprising at least one laser, having a laser cavity, for generating a measuring beam, converging means for converging the measuring beam in an action plane and converging measuring beam radiation reflected by the object in the laser cavity to generate a self-mixing effect in the laser, and measuring means for measuring the result of the self-mixing effect, which effect is determined by the relative movement.

An action plane is understood to means a plane wherein the measuring beam radiation meets the object and is influenced by the movement of the object and the device relative to each other. The laser self-mixing effect is understood to mean the phenomenon that radiation emitted by a diode laser and reflected back in the laser cavity causes changes in operation of the laser cavity, which changes are due to interference of the reflected radiation re-entering the cavity with the optical wave generated in the laser cavity. The device uses the self-mixing effect in combination with the Doppler effect. The latter effect is the phenomenon that a beam of radiation reflected by the object undergoes a frequency shift called Doppler shift if the object moves in the propagation direction of the beam. If the reflected beam re-enters the cavity of the laser which emits the beam, changes in operation of the laser cavity will occur, which changes are determined by the movement of the object. These changes (undulations) are repetitive as a function of the object (or external reflector) over a distance equal to half the wavelength of the laser radiation. This means that the laser frequency becomes proportional to the speed of the object.

A measuring device based on laser self-mixing demonstrates a high sensitivity, and thus accuracy, which can be attributed to the fact that the reflected light re-entering the laser cavity determines the laser frequency and thus is amplified in the laser cavity. Such a device is disclosed in PCT application WO 02/37410, which describes the principle of operation of the device, a number of embodiments and possible applications of the device, and is incorporated herein by reference.

However, the measuring range of the device described above is limited by the coherence length of the laser radiation, because of the requirement that the radiation reflected by the object should interact coherently with the radiation generated in the laser such that the complete system (i.e. laser+object) can establish a new equilibrium. Thus, the measuring beam is converged in an action plane at the coherence length of the laser such that radiation reflected back by an object at the action plane and re-entering the laser cavity, interacts coherently with the optical wave in the laser cavity to generate the above-mentioned self-mixing effect. As a result, it is not possible to use such a device to accurately measure speed or distance of an object if it is located further away from the device than the coherence length of the laser.

In an alternative system, known as an interferometric system, radiation reflected from an object is mixed with radiation emitted by the laser at the position of a radiation-sensitive detector. In the interferometric system, the original laser equilibrium does not change, but the Doppler shift caused by the moving object results in undulations of the output signal of the detector. These undulations are of a similar nature to the undulations occurring in the laser self-mixing device described above. If in the interferometric system, the distance to the object exceeds the coherence length of the laser radiation, the detector signal becomes essentially noise having a certain bandwidth of about twice the line width of the laser source. The obtained spectrum looks like a bell-shaped curve, the center of which shifts with increasing object speed. As a result, although the interferometric system allows speed determination in respect of objects located at a distance greater than the coherence length of the laser, the accuracy of the speed measurement becomes dependent upon parameters such as line width, measurement time, signal level, etc. and it is not possible to determine the exact position of the object. Moreover, in contrast to the self-mixing laser device described above, an interferometric system does not comprise a receiver that is tuned to the wavelength of interest, i.e. the wavelength of the received radiation so that an optimum measuring signal amplitude is not obtained. Still further, for a number of applications, especially in the consumer field, an interferometric system and its cost is prohibitive.

It is an object of the present invention to provide a laser self-mixing device of the type described in the opening paragraph, whereby the measuring range is extended relative to the prior art simple construction and small size of the device is retained.

In accordance with the present invention, there is provided a device for measuring movement of an object and the device relative to each other, the device comprising at least one laser, having a laser cavity, for generating a measuring beam, converging means for converging the measuring beam in an action plane and converging measuring beam radiation reflected by the object in the laser cavity to generate a self-mixing effect in the laser, and measuring means for measuring the result of the self-mixing effect, which effect is determined by said relative movement, wherein said converging means are arranged to focus said measuring beam over a distance range that extends beyond the coherence length of said measuring beam radiation, and wherein said measuring means are configured to determine frequency difference between the measuring beam and the measuring beam radiation reflected by an object in the laser cavity.

Also in accordance with the present invention, there is provided a method for measuring movement of an object and the device relative to each other, the method comprising generating a measuring beam by means of at least one laser having a laser cavity, converging the measuring beam in an action plane over a distance range that extends beyond the coherence length of the measuring beam radiation and converging measuring beam radiation reflected by the object in the laser cavity to generate a self-mixing effect in the laser, and determining a mean frequency difference between the measuring beam and the measuring beam radiation reflected by an object in the laser cavity, said mean frequency shift being determined by said relative movement.

Thus, the present invention is based on the insight that radiation reflected in the laser cavity from distances larger than the coherence length of the measuring beam radiation also provokes sufficient self-mixing in the laser cavity so that a useful signal for determining the relative signal can be obtained and by using an incoherent detection method, i.e. determining a frequency difference between the measuring beam and the reflected measuring beam radiation, relatively accurate movement measurements can be obtained in respect of objects located at relatively larger distances from the device.

In one exemplary embodiment, the measuring means are configured to determine a mean frequency shift of the noise spectrum generated by the reflected measuring beam radiation. Alternatively, the measuring means may be configured to determine a momentary frequency shift of the noise spectrum generated by the reflected measuring beam radiation. In yet another exemplary embodiment, the measuring means may be configured to perform a time-domain detection of frequency shifted and non frequency shifted reflected measuring beam radiation. In the case where more than the mean frequency shift is determined (i.e. momentary or time-dependent), both speed and distance can be determined.

The device is beneficially configured to determine a distance between said device and an object, moving or non-moving relative thereto.

In one exemplary embodiment, means may be provided for controlling said at least one laser, wherein said control means may be configured to supply said at least one laser with a periodically varying electrical current, which causes a periodic variation of the measuring beam wavelength, such that the spectrum of the reflected measuring beam radiation overlaps substantially with the measuring beam radiation generated by said at least one laser.

Alternatively, the control means may be configured to supply said at least one laser with a periodically varying electrical current, which causes a periodic variation of the measuring beam wavelength, such that the spectrum of the reflected measuring beam radiation overlaps at most partially with the measuring beam radiation generated by said at least one laser. As a result, an RF signal is obtained due to mixing of the radiation generated by the laser and the reflected radiation as amplified by the laser.

In another exemplary embodiment of the invention, the control means may be configured to supply the laser with a pulsed current, whereby a momentary overlap of a laser pulse and a corresponding reflected radiation pulse may be determined.

The device may be arranged and configured to be selectively operated in one of a first and second detection mode, said first detection mode being a coherent detection mode and the second detection mode being an incoherent detection mode. Accordingly, the converging means may have a fixed focus in one exemplary embodiment or a selectively variable focus in another exemplary embodiment so as to selectively focus said measuring beam radiation at or beyond the coherence length of the measuring beam radiation.

These and other aspects of the present invention will be apparent from, and elucidated with reference to, the embodiments described herein.

Embodiments of the present invention will now be described by way of examples only and with reference to the accompanying drawings, in which.

Figure 1:
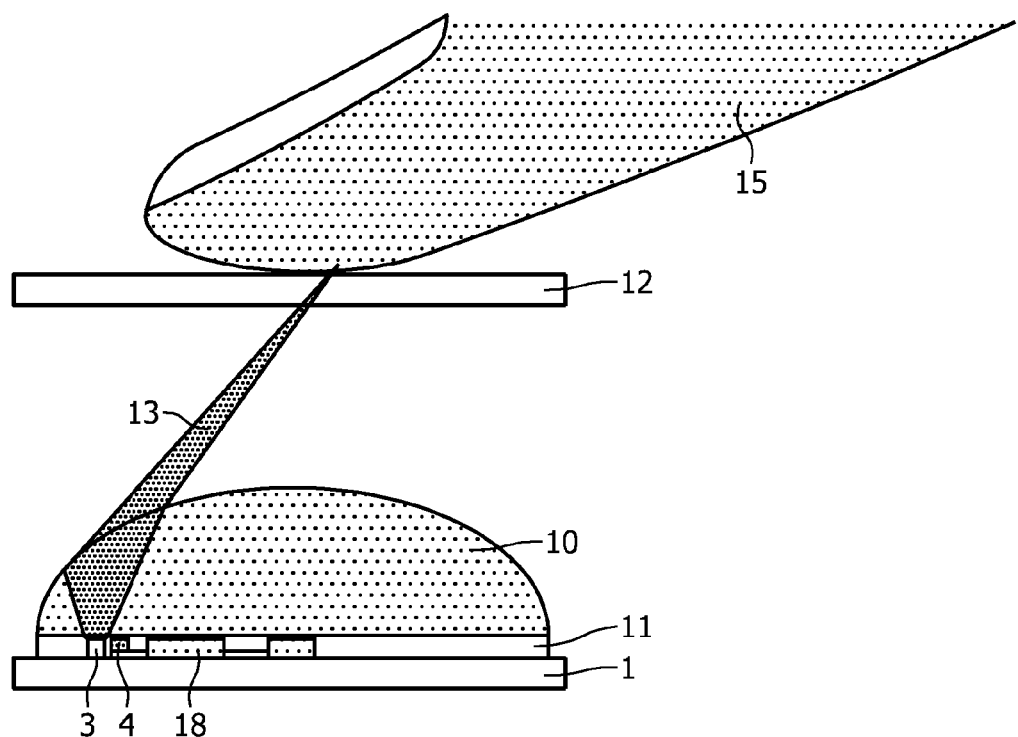
FIG. 1 is a diagrammatic cross-section of an input or control device according to the prior art.
Figure 4:
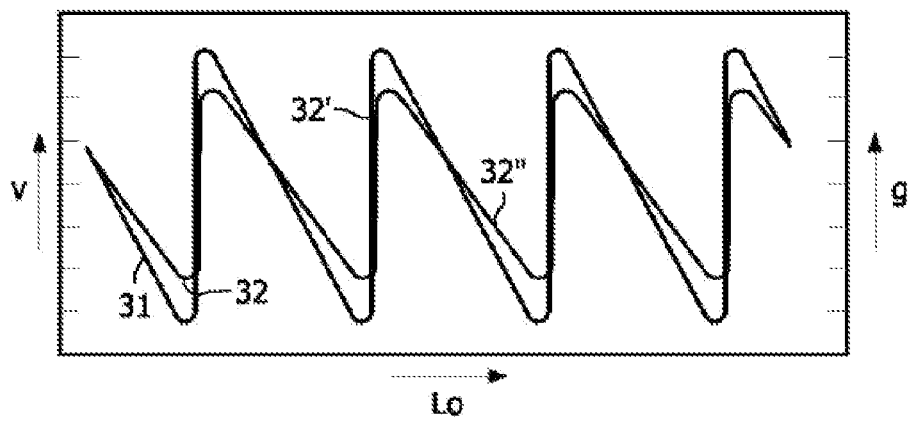
Figure 5:
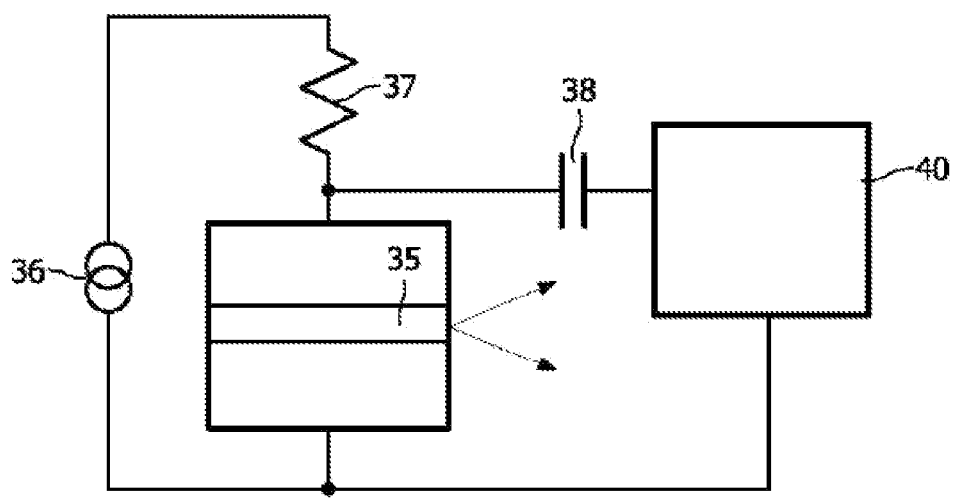
Figure 6:
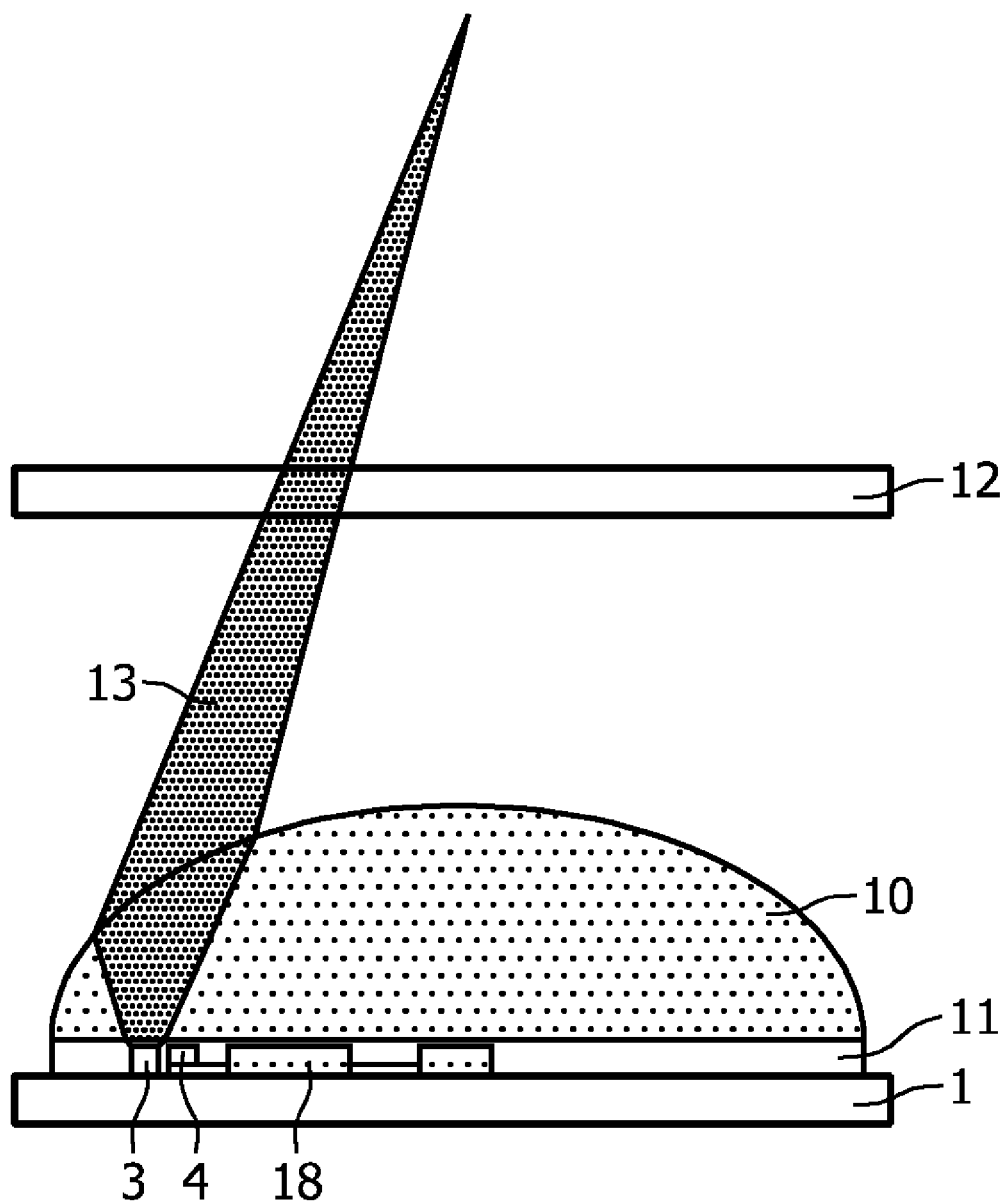

FIG. 4 illustrates graphically the variation of the optical frequency and of the gain of the laser cavity as a function of the movement of the device of FIG. 1 and the object relative to each other wherein FIG. 4 shows a typical curve for the case of coherent mode operation for the incoherent case, the optical frequency and gain of the cavity show a weather, sinusoidal (as opposed to sawtooth) variation with added noise;

FIG. 5 illustrates schematically a measuring method used in the device of FIG. 1;

FIG. 6 is a diagrammatic cross-section of an input or control device according to an exemplary embodiment of the present invention;

The principle of operation, and general structure, of a self-mixing laser device according to the prior art will first be described with reference to FIGS. 1 to 4 of the drawings.

Figure 2:
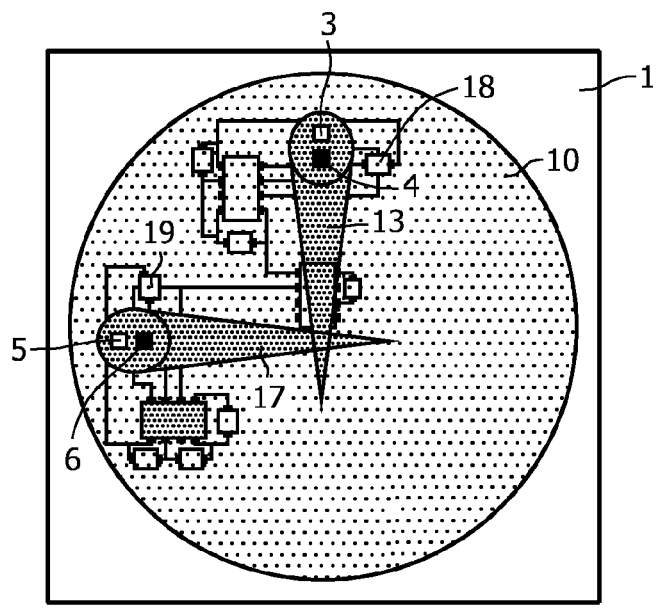
FIG. 2 is a diagrammatic plan view of the device of FIG. 1.

FIG. 1 is a diagrammatic cross-section of the input or control device described in WO02/37410. The device comprises at its lower side a base plate 1, which is a carrier for the diode lasers, in this embodiment lasers of the type VCSEL, and the detectors, for example photo diodes. In FIG. 1 only one diode laser 3 and its associated photo diode 4 is visible, but usually at least a second diode laser 5 and associated detector 6 is provided on the base plate, as shown in the FIG. 2 top view of the apparatus. The diode lasers 3 and 5 emit laser, or measuring, beams 13 and 17, respectively. At its upper side the device is provided with transparent window 12 across which an object 15, for example a human finger is to be moved. A lens 10, for example a plano-convex lens is arranged between the diode lasers and the window. This lens focuses the laser beams 13 and 17 at or near the upper side of the transparent window. If an object 15 is present at this position, it scatters the beam 13. A part of the radiation of beam 13 is scattered in the direction of the illumination beam 13 and this part is converged by the lens 10 on the emitting surface of the diode laser 3 and re-enters the cavity of this laser. As will be explained hereinafter, the radiation returning in the cavity induces changes in this cavity, which results in, inter alia, a change of the intensity of the laser radiation emitted by the diode laser. This change can be detected by the photo diode 4, which converts the radiation variation into an electric signal, and an electronic circuitry 18 for processing this signal. The illumination beam 17 is also focused on the object, scattered thereby and part of the scattered radiation re-enters the cavity of the diode laser 5. The circuitry 18 and 19, for the signal of the photo diode 6, shown in FIGS. 1 and 2 has only an illustrative purpose and may be more or less conventional. As is illustrated in FIG. 2, this circuitry is interconnected.

Figure 3:
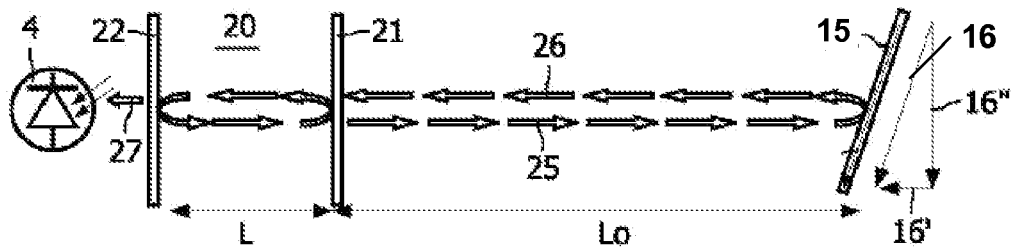
FIG. 3 illustrates schematically the principle of the measuring method used in the device of FIG. 1.

FIG. 3 illustrates the principle of the input device and the method of measuring according to the prior art when a horizontal emitting diode laser and a monitor photo diode arranged at the rear facet of the laser are used. In this Figure, the diode laser, for example diode laser 3 is schematically represented by its cavity 20 and its front and rear facets, or laser mirrors, 21 and 22, respectively. The cavity has a length L. The object, whose movement is to be measured, is denoted by reference numeral 15. The space between this object and the front facet 21 forms an external cavity, which has a length $L_o$. The laser beam emitted through the front facet is denoted by the reference numeral 25 and the radiation reflected by the object in the direction of the front facet is denoted by reference numeral 26. Part of the radiation generated in the laser cavity passes through the rear facet and is captured by the photo diode 4.

If the object 15 moves in the direction of the illumination beam 13, the reflected radiation 26 undergoes a Doppler shift. This means that the frequency of this radiation changes or that a frequency shift occurs. This frequency shift is dependent on the velocity with which the object moves and is of the order of a few kHz to MHz. The frequency-shifted radiation re-entering the laser cavity interferes with the optical wave, or radiation generated in this cavity, i.e. a self-mixing effect occurs in the cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and thus easy to detect. The combination of self-mixing effect and the Doppler shift causes a variation in the behavior of the laser cavity; especially its gain, or light amplification, varies.

This is illustrated in FIG. 4. In this Figure, curves 31 and 32 represent the variation of the frequency ν of the emitted laser radiation and the variation of the gain g of the diode laser, respectively, as a function of the distance $L_0$ between the object 15 and the front mirror 21. Both ν, g and $L_0$ are in the arbitrary units. As the variation of the distance $L_0$ is the result of movement of the object, the abscissa of FIG. 4 can be re-scaled in a time axis, so that the gain will be plotted as a function of time. The gain variation Δg as a function of the velocity v of the object is given by the following equation (for the coherent case):

$$\Delta g = \frac{K \cdot \cos}{L} \cdot \frac{\{4\pi \upsilon \cdot v \cdot t}{c} + \frac{4\pi \cdot L_0 \cdot t\}}{c}$$

In this equation:
K is the coupling coefficient to the external cavity; it is indicative of the quantity of radiation coupled out of the laser cavity;
ν is the frequency of the laser radiation;
v is the velocity of the object in the direction of the illumination beam;
t is the moment of time; and
c is the light velocity.

The equation can be derived from the theory on the self-mixing effect disclosed in the two articles mentioned herein above. The object surface is moved in its own plane, as is indicated by the arrow 16 in FIG. 3. Because the Doppler shift occurs only for an object movement in the direction of the beam, this movement 16 should be such that it has a component 16' in this direction. Thereby, it becomes possible to measure the movement in an XZ plane, i.e. the plane of drawing of FIG. 3 which movement can be called the X movement. FIG. 3 shows that the object surface has a skew position with respect to the rest of the system. In practice, usually the measuring beam is a skew beam and the movement of the object surface will take place in an XY-plane. The Y-direction is perpendicular to the plane of the drawing in FIG. 3. The movement in this direction can be measured by a second measuring beam, emitted by a second diode laser, and scattered light of which is captured by a second photo diode associated with the second diode laser. A (the) skew illumination beam(s) is (are) obtained by arranging the diode laser (s) eccentrically with respect to the lens 10, as shown in FIG. 1.

Measuring the variation of the laser cavity gain caused by the object movement by measuring the intensity of the radiation at the rear laser facet by a monitor diode is the simplest, and thus the most attractive way. Conventionally, this diode is used for keeping the intensity of the laser radiation constant, but now it is also used for measuring the movement of the object.

Another method of measuring the gain variation, and thus the movement of the object, makes use of the fact that the optical gain of a semiconductor material is a function of the number of electrons in the conduction band in the junction of the laser. The voltage drop across a semiconductor diode is a function of the carrier concentration and any variation in optical gain results in a variation in the voltage across the junction. An embodiment of this measuring method is illustrated in FIG. 5. In this Figure, the active layer of the diode laser is denoted by the reference number 35 and the current source for supplying this laser is denoted by reference numeral 36. The voltage across the diode laser is supplied to an electronic circuit 40 via a capacitor 38. The inductance 37 of the bondwire is in series with the diode laser and is chosen low enough to form an insignificant impedance for the signal across the diode laser.

Besides the amount of movement, i.e. the distance across which the object is moved and which can be measured by integrating the measured velocity with respect to time, also the direction of movement has to be detected. This means that it has to be determined whether the object moves forward or backward along an axis of movement. The direction of movement can be detected by determining the shape of the signal resulting from the self-mixing effect. As shown by graph 32 in FIG. 4, this signal is an asymmetric signal. The graph 32 represents the situation where the object 15 is moving towards the laser. The rising slope 32' is steeper than the falling slope 32". As described in Applied Optics, Vol. 31, No. 8, 20 Jun. 1992, pages 3401-3408, the asymmetry is reversed for a movement of the object away from the laser, i.e. the falling slope is steeper than the rising slope. By determining the type of asymmetry of the self-mixing signal, the direction of movement of the object can be ascertained.

In the input device described in WO 02/37410, the converging means, or lens 10, is of such type and is arranged such that it focuses the measuring beam on the object 15. In practice, this means that the measuring beam is focused in the plane of the upper surface of the device window 12, because when using the device the human finger, or object 15, will be put on this surface and moved across it. In the arrangement described in PCT application WO 2005/076116, it is proposed to adapt the focus of the lens of a self-mixing laser input device to extend the working range of the device. The focus is adapted to provide a self-mixing effect that is smaller than a possible maximum but larger than a threshold for an extended range of distances between the object and the device. However, because the device still uses the coherent detection method described above, the measuring range is still somewhat limited.

In accordance with the invention, therefore, it is proposed to provide converging means that act to focus the measuring beam at a distance beyond the coherence length of the laser radiation and to configure the device so as to operate in an incoherent detection mode (rather than the coherent detection mode used in the prior art devices) to determine the mean frequency shift of the noise spectrum generated by radiation reflected into the laser cavity by an object at a distance from the device that is larger than the coherence length of the radiation. The invention is based on the insight that radiation re-entering the laser cavity from larger distances than the coherence length of the laser measuring beam also provokes sufficient self-mixing in the cavity to provide a useful signal for measuring the speed of the object. It has been determined that the accuracy of speed measurement using the device according to the present invention is comparable to that of interferometric systems, but without the complexity and high cost. Furthermore, the device of the present invention is not affected by background radiation and its laser cavity has a high gain for the wavelength of the measuring radiation only.

Thus, referring to FIG. 6 of the drawings, the converging means 10 is modified such that it focuses at a larger distance. Furthermore, the device described in WO 02/37410 and that described in WO 2005/076116 determines the speed and direction of travel of an object using an undulating signal (as shown in FIG. 4), whereas in the present invention, the shift of mean frequency of the generated noise spectrum is determined.

In embodiments wherein the radiation reflected by the object has no phase relation with the radiation generated in the laser, a radiation-sensitive detector (photo-diode) is used to determine a mixed radiation composed of radiation generated by the laser and laser radiation reflected by the object.

The diode laser may be supplied with a periodically varying electrical current in a similar way as in the device of WO02/37410 so that the wavelength of the laser radiation is modulated. This allows determining the direction of movement of the object and the device with respect to each other. In the device of WO02/37410 wherein the spectra of the radiation generated by the laser and the radiation reflected by the object need not to overlap, the modulation is relatively large; the amplitude of the wavelength modulation is, for example 0.4 nm, which corresponds with a frequency modulation of 50 GHz.

In a first embodiment of the new device the wavelength modulation is very small such that the optical spectrum of the radiation generated by the laser substantially overlaps the noise spectrum of the radiation reflected by the object and the shift of the mean frequency of the latter spectrum can be determined.

In a second embodiment the laser modulation pattern is such that the spectrum of the radiation reflected by the object shows only partial or no overlap with the spectrum of the radiation generated by the laser. At the position of a radiation-sensitive detector the laser generated radiation and the reflected radiation interfere and provide a detector signal at useful RF frequencies, which is suitable for further signal processing to obtain a final signal that is indicative of the movement of the device and the object with respect to each other.

In a third embodiment the laser is simply pulsed, instead of periodically modulated, and the momentary overlap of a laser pulse and a radiation pulse reflected by the object is determined. This overlap is representative of the time of flight of the reflected pulse and thus of the distance between the object and the device. Since the heat-up portion of any laser pulse already causes a wavelength variation of the laser radiation, the direction of movement of the device and the object with respect to each other can be determined, without using a periodically varying electrical supply current for the laser.

The converging means, for example a single lens may have a fixed focus. It is also possible to use a lens having controllable focus, which allows collecting maximum amount of reflected radiation. The controllable lens may, for example, be a so-called liquid lens, which comprises two liquids having different refractive indices and a meniscus shaped interface between them. The curvature of the meniscus and thus the lens power can be changed by a voltage. The liquid lens may be controlled by means of an input device as disclosed WO02/37410.

It is noted that the term object is a general term comprising a single solid object, particles in a medium, a medium itself (for which refractive index is to be determined, for example) etc.

In one exemplary embodiment, the present invention provides a laser self-mixing device, which may operate at two modes: a first, coherent and very high sensitivity mode suitable for objects at a close distance and a second, non-coherent, mode having a reduced sensitivity and suitable for remote objects.

The invention may be used for measuring distance and movements (both speed and direction) of objects. It provides a low-cost alternative for interferometric devices. The invention may also be used for determining the refractive index of media.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A device for measuring movement of an object and the device relative to each other, the device comprising:
   at least one laser, having a laser cavity, that generates a measuring beam,
   a converging element that is configured to converge the measuring beam in an action plane and to converge, in the laser cavity, measuring beam radiation reflected by the object, to generate a self-mixing effect in the laser, and
   a measuring element that is configured to measure the result of the self-mixing effect, which effect is determined by the relative movement, wherein:
   the converging element is arranged to focus the measuring beam over a distance range that extends beyond the coherence length of the measuring beam radiation, and
   the measuring element is configured to determine the movement of the object based on a frequency difference between the measuring beam and the measuring beam radiation reflected by an object in the laser cavity.

2. The device of claim 1, wherein the measuring element is configured to determine a mean frequency shift of the noise spectrum generated by the reflected measuring beam radiation.

3. The device of claim 1, wherein the measuring element is configured to determine a momentary frequency shift of the noise spectrum generated by the reflected measuring beam radiation.

4. The device of claim 1, wherein the measuring element is configured to perform a time-domain detection of frequency shifted and non-frequency shifted reflected measuring beam radiation.

5. The device of claim 1, wherein the measuring element is configured to determine a distance between the device and the object.

6. The device of claim 1, including a controller that is configured to control the at least one laser.

7. The device of claim 6, wherein the controller is configured to supply the at least one laser with a periodically varying electrical current that causes a periodic variation of the measuring beam wavelength, such that a spectrum of the reflected measuring beam radiation overlaps substantially with the measuring beam radiation generated by the at least one laser.

8. The device of claim 6, wherein the controller is configured to supply the at least one laser with a periodically varying electrical current that causes a periodic variation of the measuring beam wavelength, such that a spectrum of the reflected measuring beam radiation overlaps at most partially with the measuring beam radiation generated by the at least one laser.

9. The device of claim 6, wherein the controller is configured to supply the at least one laser with a pulsed current.

10. The device of claim 1, arranged and configured to be selectively operated in one of a first and second detection mode, the first detection mode being a coherent detection mode and the second detection mode being an incoherent detection mode.

11. The device of claim 1, wherein the converging means has a fixed focus.

12. The device of claim 1, wherein the converging means has a selectively variable focus so as to selectively focus the measuring beam radiation at or beyond the coherence length of the measuring beam radiation.

13. A method for measuring movement of an object and the device relative to each other, the method comprising:
   generating a measuring beam using at least one laser having a laser cavity,
   converging the measuring beam in an action plane over a distance that extends beyond the coherence length of the measuring beam radiation,
   converging, in the laser cavity, measuring beam radiation reflected by the object to generate a self-mixing effect in the laser, and
   determining a mean frequency difference between the measuring beam and the measuring beam radiation reflected by an object in the laser cavity, the relative movement being determined by the frequency difference.

* * * * *